July 29, 1947. P. H. HARRER 2,424,821
BALING MACHINE
Filed Feb. 28, 1944 4 Sheets-Sheet 1

Fig. 1

Inventor
P. H. Harrer
by K. S. Wyman
Attorney

July 29, 1947.  P. H. HARRER  2,424,821
BALING MACHINE
Filed Feb. 28, 1944  4 Sheets-Sheet 2

Inventor
P. H. Harrer
by K. S. Wyman
Attorney

Fig. 6

July 29, 1947. P. H. HARRER 2,424,821
BALING MACHINE
Filed Feb. 28, 1944 4 Sheets-Sheet 4

Patented July 29, 1947

2,424,821

UNITED STATES PATENT OFFICE 2,424,821

BALING MACHINE

Paul H. Harrer, La Porte, Ind., assignor to Allis-Chalmers Manufacturing Company, Milwaukee, Wis., a corporation of Delaware Application February 28, 1944, Serial No. 524,190

19 Claims. (Cl. 100—1)

This invention relates to baling machines of the type embodying means positionable to roll material delivered thereto into a formed cylindrical bale of predetermined diameter and positionable to discharge the formed bale from the machine, apparatus for wrapping binding material (hereafter called twine) around the formed bale while it is in the machine, and a conveyor which operates to deliver material to the bale forming means and which is stopped during the bale wrapping and discharging operations and has for its primary object the provision of an improved correlation of features such that after each bale discharging operation the various parts of the bale forming means must be returned to their initial bale starting positions before the conveyor can be started to again deliver material thereto.

Another object of this invention is to provide a machine of the type herein specified with an improved conveyor drive and control mechanism correlated to infallibly perform all phases of the baling cycle in accurately timed sequence thereby minimizing the time required to complete the cycle and consequently increasing the number of bales which can be formed and wrapped in a given time.

A further object of this invention is to provide a machine of the type herein specified with an improved conveyor drive and control mechanism operative to immediately stop the conveyor in response to the bale attaining a predetermined diameter and operative when the bale is discharged from the machine to immediately start the conveyor in response to a return of the bale forming means to its initial bale starting position.

The significance of the previously stated objects and the manner in which they may be readily accomplished in whole or in part will become apparent as the disclosure progresses and particularly points out additional objects, advantages and features which are considered of special importance and of general application although shown and described as applied to the type of machine disclosed in U. F. Luebben's rotary baler patents, U. S. 2,096,990 and 2,336,491, issued October 26, 1937, and December 14, 1943, respectively.

Accordingly the invention may be considered as consisting of the various details of construction, correlations of elements and arrangements of parts as is more fully set forth in the appended claims and in the detailed description, reference being had to the accompanying drawings, in which:

Figure 1:
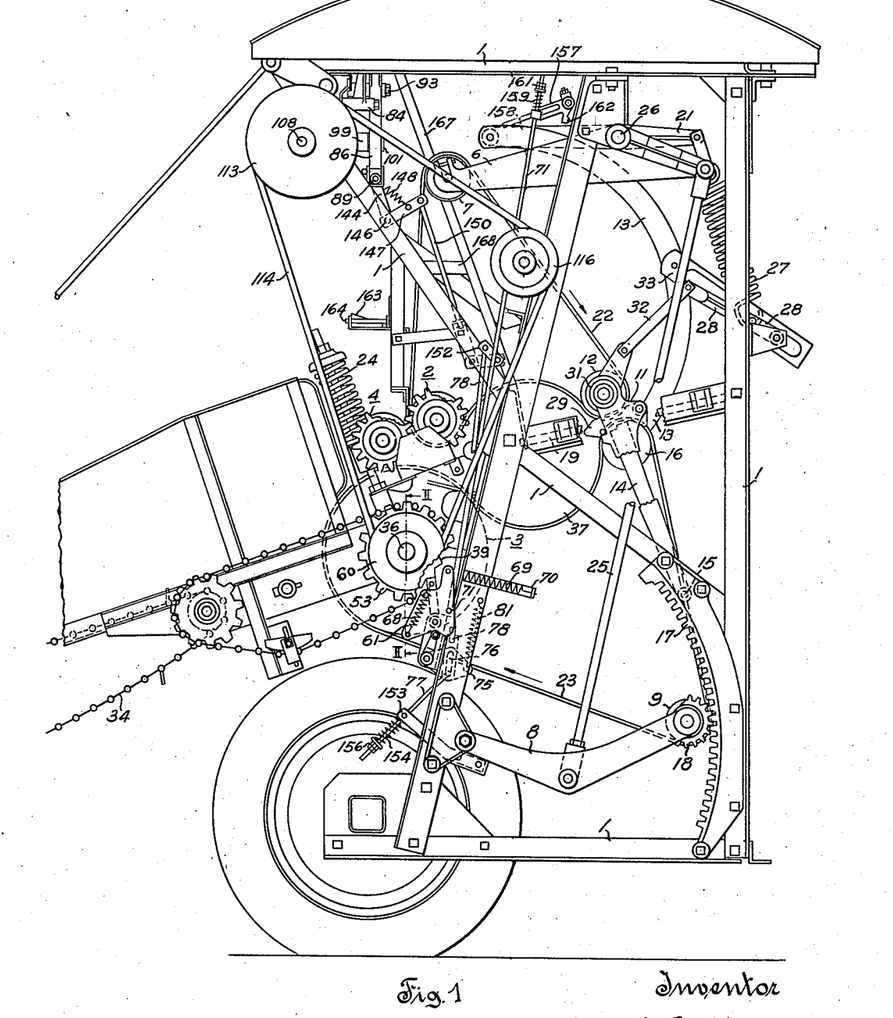
Fig. 1 is a side view of a baling machine embodying the invention with parts broken away to better show details of construction.

Referring to Fig. 1 of the drawings, it is seen that the invention may be applied to a wheel supported baling machine comprising a frame structure 1 operatively mounting an upper drive roll assembly 2, a lower drive roll assembly 3, a press roll assembly 4, an upper tension roll assembly including a pivotally supported tension arm 6 rotatably mounting a roll 7, a lower tension roll assembly including a pivotally supported tension arm 8 rotatably mounting a roll 9, an upper trip roll assembly including an arm 11 rotatably supporting a roll 12, a lower trip roll assembly including a hanger or bow member 13 supporting at its lower end an arm 14 which in turn rotatably mounts a roll 16, an arcuate rack 17 which is secured to frame 1 and with which is engaged a pinion 18 carried by the adjacent end of lower tension arm 8, a pivotally mounted latch release bar 19, and a discharge rocker arm 21.

One or more endless bale forming bands 22 are mounted for movement over the roll portion of drive assembly 2, over the roll 7 of the upper tension assembly, and over the roll 12 of the upper trip assembly. Also, one or more endless bale forming bands 23 are mounted for movement over the roll portion of drive assembly 3, over the roll 9 of the lower tension assembly and over the roll 16 of the lower trip assembly; the bands 22 and 23 being driven in opposite directions by the roll portions of the drive assemblies 2 and 3, respectively. Press roll assembly 4 is preferably gear driven by the upper drive roll assembly 2 and the roll portion of assembly 4 is preferably releasably held in engagement with the roll portion of lower drive assembly 3 by means of one or more springs 24.

The upper and lower tension arms 6 and 8 are pivotally interconnected for simultaneous angular movement by means of a rod 25 and the upper tension arm 6 and the discharge rocker arm 21 are mounted for relative angular movement about a common fulcrum 26; arm 6 being biased by a spring (not shown) for clockwise movement about said fulcrum and the arm 21 being biased against movement in a counterclockwise direction by a spring 27 having one end connected with one arm of a bell crank lever 28 and having its other end connected with the adjacent end of the arm 21. Trip roll arms 11 and 14 are pivotally interconnected at 15 for relative angular movement and are normally retained locked in the alined position shown by means of a releasable latch 29 carried by the arm 11 in a position to engage the top portion of the arm 14. The arm 11 also has mounted thereon a flanged wheel 31 adapted to engage and roll along the top surface of the inclined portion of the frame structure which mounts the latch release bar 19; said arm and wheel being supported for coaction with said top surface by means of a link 32 connecting the upper end of arm 11 with an arm of bell crank lever 28. Movement of bow member 13 toward the lower drive roll assembly is limited by a looped link 33. Material to be baled is delivered to a point adjacent the roll portions of press roll assembly 4 and lower drive roll assembly 3 by means of an endless conveyor 34 which is chain driven by shaft 36 forming a part of the lower drive roll assembly 3.

The various parts thus far described are constructed and correlated to operate in substantially the same manner as the corresponding parts of the previously identified Luebben patents and a further description of such parts is deemed unnecessary for a complete understanding of the present invention; it being sufficient in this connection to point out that the material passing between the roll portions of press roll assembly 4 and lower drive roll assembly 3 is engaged by the endless bale forming bands 22 and 23 and rolled into a compact cylindrical bale 37 and that when the bale attains a desired diameter the conveyor or the feed of material thereto is stopped and the latch release bar 19 actuated to lift latch 29 on arm 11 whereupon the upper and lower trip roll assemblies move apart permitting the bale to roll rearward from between the bands 22 and 23 and out of the machine; the trip roll and tension assemblies automatically returning to their initial bale starting positions with the arms 11 and 14 relatched in alinement as shown.

Figure 2:
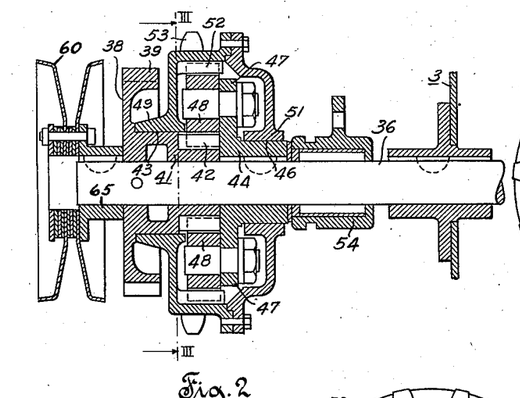
Fig. 2 is a partial section taken on line II—II of Fig. 1.
Figure 3:
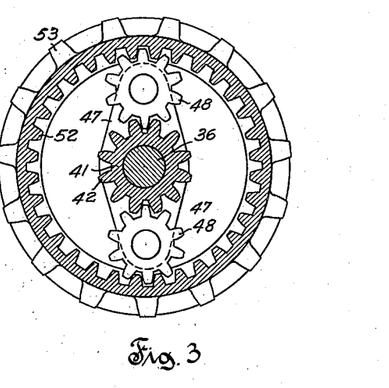
Fig. 3 is a section taken on line III—III of Fig. 2.
Figures 4, 5:
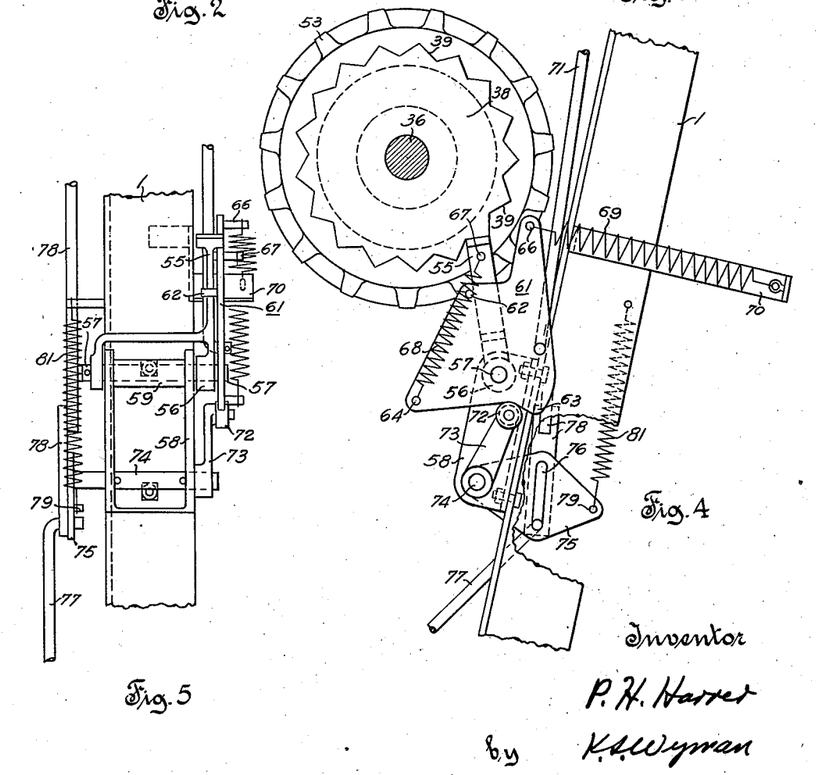
Fig. 4 is an enlarged side view of the conveyor drive control mechanism shown in Fig. 1 with parts omitted to better show the construction.
Fig. 5 is a front view of the latch mechanism shown in Fig. 4.

Referring to Figs. 2, 3 and 4, it is seen that the driving connection between shaft 36 of lower drive roll assembly 3 and the conveyor 34 comprises a clutch element having a disk portion 38 presenting an external ratchet-like peripheral surface 39 and having an axially extending hub portion 41 rotatably mounted on said shaft and presenting an external gear 42 and an external journal 43 disposed between said disk portion and gear, a member including an axially extending hub portion 44 keyed to shaft 36 for movement therewith with one end abutting the adjacent end of the hub portion 41 of the clutch element and with its opposite end portion presenting an external coaxial journal 46 axially spaced from the journal 43 on the clutch element and including a pair of oppositely disposed radially extending arms 47, an idler gear 48 rotatably mounted on each arm 47 for movement therewith and so as to continually mesh with the external gear 42 as the idler gear moves coaxially about the shaft 36, a conveyor drive element including axially spaced hub portions 49 and 51 rotatably mounted on the journals 43 and 46, respectively, and including an intermediate annular portion presenting an internal coaxial gear 52 in continuous mesh with the idler gears 48 and an external chain sprocket 53, a shaft supporting bearing 54, and a pawl 55 adapted to engage the ratchet-like surface 39 on disk portion 38 of the clutch element. The hub portion 41 of the clutch element is retained in abutting relation against the fixed hub portion 44 by means of a V-belt pulley 60 having its hub portion 65 keyed to shaft 36 in abutting engagement with the adjacent side of hub portion 41.

Referring also to Fig. 5, it is seen that pawl 55 includes a bifurcated hub portion 56 pivotally mounted on the opposite exposed end portions of a pivot pin 57 which is in turn rotatably mounted in a box-like bracket 58 on the frame structure 1 immediately adjacent the lower drive roll assembly 3 by means of alined openings and a spacer tube 59 through which the pin 57 extends. The right hand end portion (see Fig. 5) of pivot pin 57 has secured thereto for movement therewith a latch plate 61 provided with a pin 62 adapted to be engaged by pawl 55, with a cam shaped lower edge portion 63, with a pawl spring biasing pin 64 and with a biasing spring pin 66. Pawl 55 is provided with a pin 67 to which is attached one end of a spring 68 having its other end secured to the pin 64 on plate 61; the spring 68 acting to hold pawl 55 engaged with pin 62. A latch plate biasing spring 69 has one end fastened to pin 66 and has its opposite end fastened to a rigid bracket 70 carried by the frame structure 1; the spring 69 acting to turn the latch plate 61 and, through the medium of pin 62 and spring 68, the pawl 55 away from the ratchet-like surface 39 of the clutch element. A pawl engaging movement of latch plate 61 may be readily effected by an upward movement of a link 71 connected thereto.

Latch plate 61 and pawl 55 are held in the position shown in Fig. 4 by means of a roller 72 which engages the cam edge portion 63 and which is carried by a crank arm 73 fixed to the adjacent exposed end of a pivot pin 74 rotatably mounted in alined openings in the box-like bracket 58. The opposite exposed end of pivot pin 74 has fixed thereon a plate 75 having an elongated opening 76 therethrough in which is positioned the upper end of a downwardly extending link 77. An upwardly extending link 78 has its lower end pivotally connected with the upper end of link 77 for movement therewith. Plate 75 also carries a spring attaching pin 79 to which is fastened one end of a spring 81 having its opposite end secured to the frame structure 1. Spring 81 acts to retain crank arm 73 and plate 75 in the positions shown in Fig. 4 thereby maintaining the pawl 55 in engagement with the ratchet-like surface 39 which prevents a rotation of the clutch element in a clockwise direction. However, due to the spring and pin connection between pawl 55 and latch plate 61, the clutch element may be rotated in a counterclockwise direction.

Referring again to Figs. 1–4 inclusive, it is seen that the roll portion of lower drive assembly 3 and consequently shaft 36 normally rotates in a clockwise direction and that as a result the arms 47 and idler gears move bodily in a clockwise direction about the shaft 36. Consequently, when the pawl 55 is engaged with the ratchet-like surface 39 of the clutch element, the gear 42 integral with the hub portion 41 thereof is held stationary and that bodily movement of the idler gears 48 about the stationary gear 42 results in a clockwise rotation of such gears which in turn drive the sprocket portion 53 in the same direction thereby moving the conveyor 34 in a direction effective to conduct material toward the roll portions of the press and lower drive roll assemblies. However, when the pawl 55 is disengaged from the ratchet-like surface 39, the clutch element is free to rotate in a clockwise direction and due to the drag or load effect of the conveyor mechanism, the sprocket 53 and internal gear portion 52 are held stationary and the continued rotation of shaft 36 merely results in a clockwise rotation of the clutch element. It should therefore be obvious that whenever link 77 is moved downward from the position shown a sufficient distance, the roller 72 on crank arm 73 releases latch plate 61 whereupon spring 69, acts to quickly effect a pawl disengaging movement of the latch plate and that due to the lost motion connection between link 77 and plate 75, the latch plate 61 remains in the position to which it is moved by the spring 69 until the link 71 is moved upward to reestablish the position shown in which it is retained by the roller 72 on crank arm 73 providing the link 77 has been moved to release plate 75 thereby permitting the spring 81 to return said plate and the crank arm 73 to their latch plate retaining positions.

Referring to Figs. 1 and 6–11 inclusive, it is seen that the frame structure 1 also has mounted thereon apparatus for wrapping twine about the formed cylindrical bale while it is in the machine comprising a pair of spring pressed twine tensioning disks 82 and a twine roller 83 both mounted on one arm of a bell crank lever 84 in such relation that the roller 83 forces the twine between the disks 82, a twine feed tube 86 having on its upper end a twine guide roller 87 for conducting the twine into the tube, having an intermediate external cam edge portion 88, and having at its lower end a twine feeding ferrule 89 through which the twine passes in leaving the tube, and a housing formed by spaced, rigidly connected and supported front and rear plates 91 and 92, respectively, operatively supporting the twine feed tube and mechanism for controllably positioning and positively moving the twine feed tube lengthwise of the bale with a substantially uniform horizontal velocity component during the bale wrapping operation.

Figure 6:
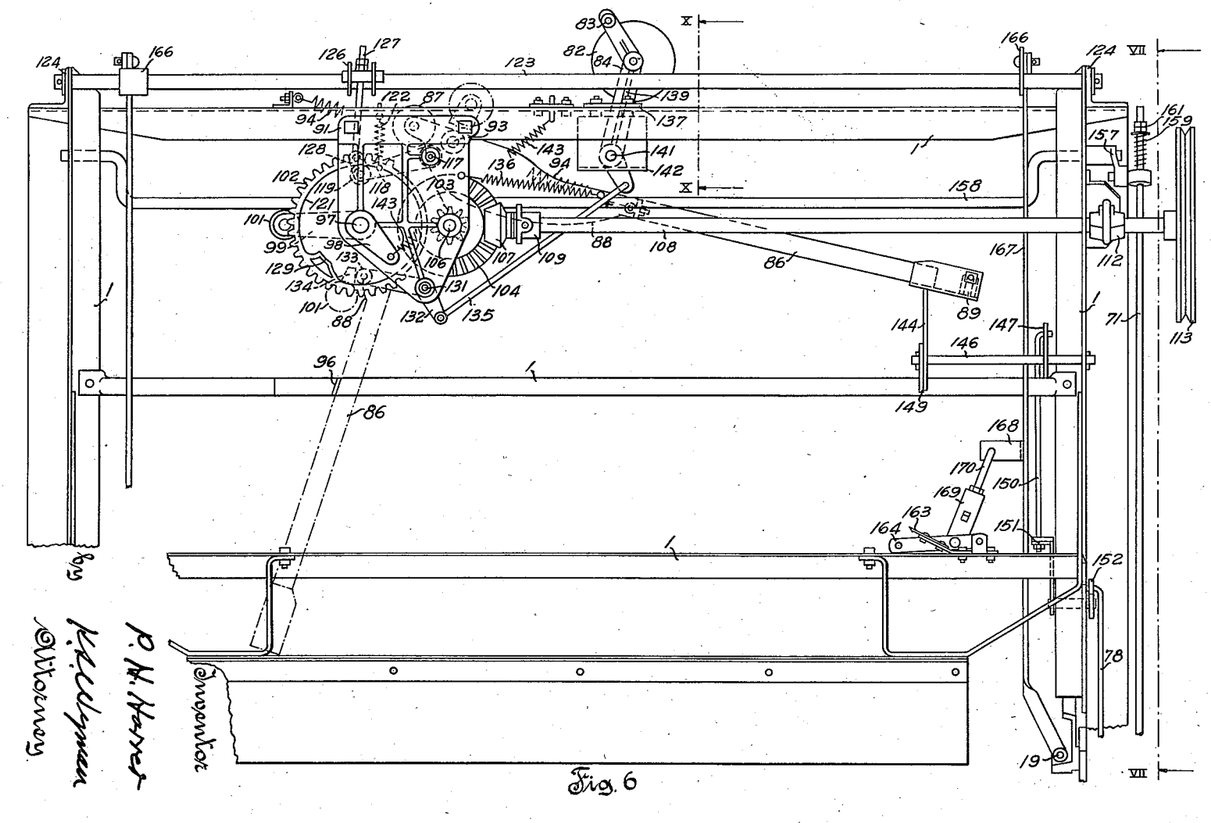
Fig. 6 is a partial front view of the machine shown in Fig. 1 illustrating the twine wrapping mechanism.

The twine tube is supported for angular movement by having its upper end pivotally mounted on a fixed pin 93 projecting laterally outward from the rear plate 92 and is biased by gravity and by the action of spring 94 to assume the dotted line position shown in Fig. 6; movement in the clockwise direction being limited by engagement with a fixed stop member 96 carried by a part of the frame structure 1. Plates 91 and 92 are provided with a pair of alined journals in which is rotatably mounted a shaft 97 having exposed front and rear end portions to which are secured crank arms 98 and 99, respectively; crank arm 99 having mounted thereon a laterally projecting roller 101 adapted to engage the cam portion 88 on twine feed tube 86. A spur gear 102 having a non-toothed peripheral portion is fixed on shaft 97 between the plates 91 and 92 in such position as to be driven through a predetermined angle by a spur gear 103 formed on the rearwardly projecting hub portion of a bevel gear 104 rotatably mounted between plates 91 and 92 on a fixed shaft 106 which extends between and is supported by said plates. Bevel gear 104 meshes with and is driven by a pinion 107 on a shaft 108 which has its adjacent end rotatably mounted in a bearing 109 carried by an integral forwardly projecting arm 111 on rear plate 92. The opposite end of shaft 108 is rotatably supported in a bearing 112 mounted on the frame structure 1 and carries at its outer end a V-belt pulley 113, which as shown in Fig. 1, is driven by a belt 114 running over an idler pulley 116 mounted on the frame structure and over drive pulley 60 on shaft 36 of the lower drive roll assembly.

Figures 7, 8, 9, 10, 11:
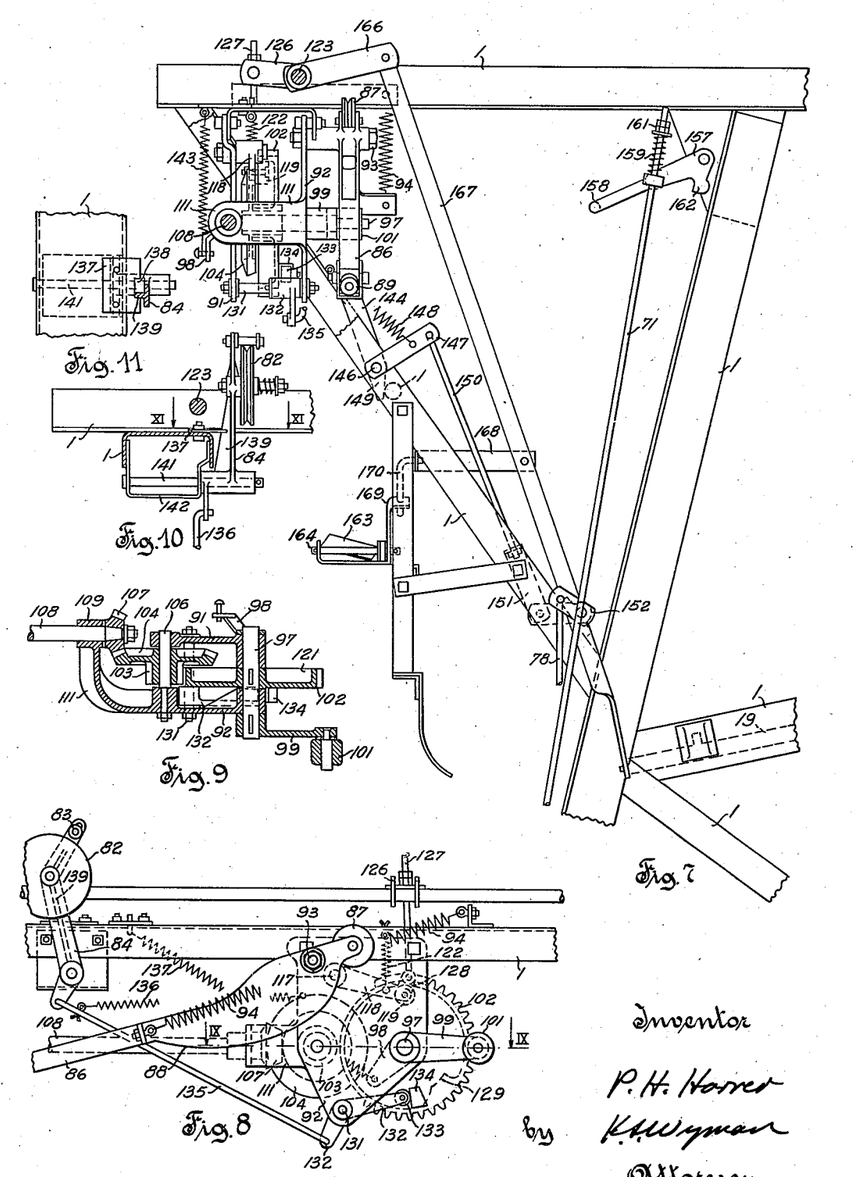
Fig. 7 is a view taken on line VII—VII of Fig. 6 with the twine tension disk assembly removed to better show the construction.
Fig. 8 is a partial rear view of the twine wrapping mechanism shown in Fig. 6.
Fig. 9 is a partial section taken on line IX—IX of Fig. 8.
Fig. 10 is a partial section taken on line X—X of Fig. 6.
Fig. 11 is a partial section taken on line XI—XI of Fig. 10.

Front plate 91 has fixed thereon a rearwardly projecting fixed pin 117 on which is pivotally mounted a crank arm 118 carrying a laterally projecting roller 119 adapted to engage and ride on the inner peripheral surface 121 of the toothed flange portion of gear 102 as is best shown in Figs. 6, 7 and 8; arm 118 being biased to maintain roller 119 in continuous engagement with surface 121 by means of a spring 122. A transverse shaft 123 is rotatably mounted in bearings 124 carried by opposite side portions of the frame structure 1 and is provided with a laterally projecting arm 126 which is connected with the roller carrying crank arm 118 by means of interconnected links 127 and 128. Surface 121 is provided with an integral cam portion 129 and the movement of roller 119 thereover results in a counterclockwise movement of crank arm 118 as viewed in Fig. 6 and a corresponding movement of shaft 123 as viewed in Fig. 7.

Plates 91 and 92 also have secured therebetween a fixed shaft 131 on which is pivotally mounted a bell crank lever 132 having on one arm thereof a roller 133 adapted to engage a stop projection 134 integral with the rear side of gear 102 as is best shown in Fig. 8 and having its other arm connected for simultaneous movement with the downwardly projecting arm of the twine tensioning disk carrying bell crank 84 by means of a link 135; the bell cranks 84 and 132 both being normally retained in the positions shown by means of the spring 136 and a stop plate 137 (see Fig. 11) having an edge recess 138 into which projects a strengthening rib 139 integral with the front face of the disk carrying arm of bell crank 84. In this connection, bell crank 84 is pivotally mounted on the rearwardly projecting portion of a fixed rod or shaft 141 carried by a rigid U-shaped bracket 142 secured to the underside of an inverted U-shaped frame member 1 (see Fig. 10) and the stop plate 137 is supported on and projects rearwardly beyond the edge of said frame member as is best shown in Fig. 11. Movement of the bell cranks 84 and 132 in a clockwise direction from the positions shown in Fig. 8 is obviously limited by the opposite edge of the recess 138 in plate 137.

The crank arm 98 fixed on shaft 97 and thereby the crank arm 99, the roller 101, and the gear 102 are normally retained in the relative positions shown by means of a spring 143 having one end fastened to a fixed part of the structure and having its other end fastened to the outer end portion of crank arm 98; the arrangement of parts being such that spring 143 acts to rotate shaft 97 and thereby gear 102 and cranks 98 and 99 in a counterclockwise direction as viewed in Fig. 6, that such movement is prevented by the engagement of roller 133 on bell crank 132 with the stop projection 134 on gear 102, that the toothed portion of partial gear 102 is in angularly spaced relation with respect to the teeth on gear 103 and therefore gear 103 is inoperative to drive gear 102 counterclockwise unless gear 102 is first rotated counterclockwise a sufficient distance to engage the first tooth thereon with the gear 103, and that the twine tube 86 is retained in its raised position by means of a latch 144 fixed on a rod 146 pivotally mounted on the frame structure 1 and biased to the position shown by means of an arm 147 fixed on rod 146 and a spring 148 connecting arm 147 with a fixed part of the structure; movement of the latch in the counterclockwise direction as viewed in Figs. 1 and 7 being limited by a stop projection 149 as shown in Fig. 7.

Referring again to Fig. 1, it is seen that the arm 147 on rod 146 is interconnected with link 78 by means of links 150, 151 and a bell crank lever 152 having one arm connected with the lower end of link 151 and having its other arm connected with the upper end of link 78. Link 77 has its lower end interconnected with a rigid extension 153 on the adjacent end of lower tension arm 8 by means of an interposed spring 154 and spring position adjusting nuts 156; the position of spring 154 determining the extent lower tension arm 8 must be moved counterclockwise from its initial starting position in order to actuate crank arm 73 and effect the release of pawl carrying latch plate 61. Latch plate link 71 has its upper end connected with an arm 157 fixed on the adjacent end of a pivotally mounted, transversely extending crank bar or rod 158 by means of an interposed spring 159 and spring position adjusting nuts 161 as is best shown in Figs. 1 and 7. Movement of the rod 158 in a counterclockwise direction and thereby the movement of link 71 and latch plate 61 in the pawl disengaging direction is limited by the engagement of a projection 162 on arm 157 with the adjacent frame structure 1. Rod 158 is positioned to be engaged by the upper end of bow member 13 as the lower trip roll assembly is returned towards and nears its initial bale starting position and the position of spring 159 determines the extent rod 158 must be moved clockwise from the position shown in order to actuate link 71 and reposition latch plate 61 and pawl 55 as shown in Figs. 1 and 4. In this connection, the spring position is preferably so adjusted that the latch plate 61 and pawl 55 are repositioned to start conveyor 34 just as soon as the trip roll assemblies return to their initial bale starting positions.

Referring once more to Figs. 1, 6 and 7, it is seen that the frame structure also mounts a fixed twine cutting knife 163 positioned to be engaged by the twine fed from the ferruled end of the tube 86 as it approaches its full line position and a pivotally mounted knife guard 164 normally positioned as shown in Fig. 6 to prevent the twine from contacting the knife, that shaft 123 is also provided with a pair of arms 166 one of which is shown as operatively connected with the adjacent end of latch release bar 19 by means of a link 167 and that the one link 167 is provided with a part 168 which is operatively connected with an arm 169 on guard 164 by means of a link 170 connecting arm 169 with part 168. The arrangement is such that a counterclockwise movement of shaft 123 as viewed in Fig. 7 swings the guard 164 upward and away from the knife and actuates latch bar 19 to release the latch 29 which normally retains the trip roll assembly arms 11 and 14 locked in alinement.

Assuming that the machine is normally operating with the various parts positioned as shown, that is with the conveyor 34 delivering material to the machine and the material passing between the roll portions of the press and lower drive roll assemblies and then around the partially formed bale 37 disposed therein, it should be obvious that the upper and lower tension rolls 7 and 9, respectively, are moving toward each other, that the upper and lower tension arms 6 and 8, respectively, are both moving in a counterclockwise direction about their points of pivotal support, that the upper and lower trip roll assemblies are moving rearward parallel to that portion of the frame structure supporting the flanged wheel 31, and that the parts will continue to move as just described until the downward movement of projection 153 on lower tension arm 8 and of links 77 and 78 releases twine tube latch 144 which permits twine tube 86 to swing downward to the dotted line position shown in Fig. 6 and turns crank arm 73 and plate 75 a sufficient distance in a clockwise direction to then release latch plate 61 which is immediately moved to its pawl disengaging position by the action of spring 69.

The dropping of twine tube 86 places the twine hanging from the ferruled end thereof on the material about to pass between the roll portions of the press and drive roll assemblies and the material carries the twine between said roll portions and around the formed bale. The conveyor 34 is still operating when the twine tube is dropped and continues to operate until the latch plate 61 is released as just described whereupon operation of the conveyor is immediately stopped. The pull exerted on the twine in passing between the roll portions of the press and drive roll assemblies moves the twine tension disk carrying bell crank 84 and the link connected bell crank lever 132 in a counterclockwise direction as viewed in Fig. 6; such movement being limited by the rib 139 on lever 84 engaging the left side of recess 138 in stop plate 137 (see Fig. 11). The counterclockwise movement of lever 132 withdraws roller 133 from engagement with stop projection 134 on gear 102 and the spring 143 connected with arm 98 on shaft 97 quickly rotates shaft 97 and thereby arm 99 and gear 102 until the first tooth on gear 102 engages the continuously rotating gear 103. When in this position, the roller 101 on arm 99 is positioned in proximate spaced relation to the cam surface 88 on twine tube 86 (see Fig. 6) and the rotation of gear 103 drives gear 102 and thereby shaft 97 and arms 98 and 99 counterclockwise with uniform angular velocity until the various parts again reach the full line position shown in Fig. 6.

During the initial rotation of gear 102 by gear 103, twine tube 86 remains stationary in its dotted line position until the roller 101 on arm 99 engages cam surface 88 and this delayed action permits one or more turns of twine to be wrapped around the adjacent end of the formed cylindrical bale. The engagement of roller 101 with cam surface 88 moves tube 86 in a counterclockwise direction toward its full line position; the shape of cam 88 preferably being such that the end of the tube 86 travels lengthwise of the bale with a substantially uniform horizontal velocity component as the tube moves from its dotted line position to its full line position and that when the tube reaches its full line position, it is held in such position until the latch 144 is repositioned to hold the tube in its raised position as shown.

In general, the correlation of parts is such that the tube 86 reaches its raised position just before the cam portion 129 on the inner peripheral surface 121 of gear 102 engages roller 119 on crank arm 118 and moves said crank arm downward in a counterclockwise direction as viewed in Fig. 6 and that the tube 86 is held in its raised position by the roller 101 on crank arm 99 until the cam portion 129 moves away from the roller 119 on arm 118. The counterclockwise movement of arm 118 is transmitted through links 127 and 128 to shaft 123 which turns in a counterclockwise direction as viewed in Fig. 7 and through the medium of arm 166 and link 167 moves the guard 164 away from knife 163 and actuates the bar 19 to release the latch 29 carried by arm 11 of the upper trip roll assembly whereupon the twine snaps against and is cut by the knife 163, the arms and rolls 11, 14 and 12, 16, respectively, of the trip roll assemblies move apart and discharge the bale from the machine, and the tension rolls 7 and 9 carried by arms 6 and 8, respectively, move away from each other to their initial bale starting positions, such movements of the tension and trip roll assemblies occurring substantially simultaneously as described in the Luebben patents hereinbefore referred to.

The cutting of the twine releases the pull on the twine tension disk carrying bell crank lever 84 which is immediately returned to its normal position shown in Fig. 6 by the spring 136 thereby repositioning the roller 133 on bell crank 132 to be engaged by the stop projection 134 on gear 102. The return of lower tension arm 8 to its initial starting position releases the pull on links 77 and 78 which permits spring 148 to reposition latch 144 beneath twine tube 86 as shown in Figs. 6 and 7. During this phase of the cycle latch plate 61 is held by spring 69 in the position determined by the engagement of stop projection 162 on arm 157 with the adjacent frame structure (note the upper end of link 71). The movement of latch 144 to its position beneath the twine tube 86 as shown in Figs. 6 and 7, takes place during the time interval the tube is held in its fully raised position by the roller 101 on arm 99, that is, during the time the cam portion 129 on gear 102 is in engagement with the roller 119 on arm 118. In this connection, it should be noted that the twine tube is held substantially stationary for a short time interval before shaft 123 is actuated by crank arm 118 to effect the removal of twine guard 164 and the release of latch 29 which permits one or more turns of twine to be wrapped around this end of the bale before the twine is cut and the bale discharged from the machine. Shortly after the cam portion 129 is disengaged from roller 119 on arm 118, the gear 102 moves out of mesh with drive gear 103 at which time arm 98 is moved over center with respect to spring 143 whereupon the action of said spring rapidly rotates gear 102 the remaining distance necessary to reposition the various parts as shown in Figs. 6 and 8.

Upon discharge of the bale from the machine, the upper and lower trip roll assemblies immediately return to their initial bale starting positions with the arms 11 and 14 locked in alinement by means of latch 29 on arm 11 and this movement of the trip roll assemblies actuates crank rod 158 and thereby link 71 which repositions latch plate 61 with pawl 55 engaging the ratchet-like surface 39 of the clutch element and immediately starts conveyor 34 to again deliver material to the press and drive roll assemblies just as soon as the various bale forming parts, that is the upper and lower tension and trip roll assemblies, are repositioned to receive the material. Consequently, the formation of another bale is positively started without any unnecessary delay and in this connection, it should now be obvious that the simplified means herein disclosed for positively driving and controlling the conveyor permits the twine tube to be dropped and the conveyor promptly stopped in accurately timed relation and that therefrom all phases of the baling operation are positively and quickly performed in accurately timed sequence.

The invention is applicable in its broadest aspects to all types of rotary baling machines and it should therefore be understood that it is not intended to limit the invention to the exact construction and mode of operation herein shown and described for purposes of illustration as various modifications within the scope of the appended claims may occur to persons skilled in the art.

It is claimed and desired to secure by Letters Patent:

1. In a machine embodying a bale forming means positionable to roll material delivered thereto into a formed cylindrical bale of predetermined diameter and positionable to discharge the formed bale from the machine, a conveyor for delivering material to said bale forming means, and means operative to move said bale forming means to its bale discharging position and to return same to its initial bale starting position, means for driving and controlling said conveyor comprising a normally rotating shaft, a pair of elements mounted for rotation relative to each other and relative to said shaft, a positive driving connection between one of said elements and said conveyor, means carried by said shaft for rotation therewith in continuous engagement with both of said elements, and means including a part responsive to the return of the bale forming means to its initial bale starting position for controlling rotation of the other one of said elements in a predetermined direction.

2. In a machine embodying a bale forming means positionable to roll material delivered thereto into a formed cylindrical bale of predetermined diameter and positionable to discharge the formed bale from the machine, a conveyor for delivering material to said bale forming means, and means operative to move said bale forming means to its bale discharging position and to return same to its initial bale starting position, means for driving and controlling said conveyor comprising a normally rotatiing shaft, a pair of elements mounted for coaxial rotation relative to each other and relative to said shaft, a continuously operative positive driving connection between one of said elements and said conveyor, means carried by said shaft for rotation therewith in continuous engagement with both of said elements, and means including a first part responsive to the bale attaining a predetermined diameter and a second part responsive to the return of the bale forming means to its initial bale starting position for controlling the rotation of the other one of said elements in a predetermined direction.

3. In a machine embodying a bale forming means positionable to roll material delivered thereto into a formed cylindrical bale of predetermined diameter and positionable to discharge the formed bale from the machine, a conveyor for delivering material to said bale forming means and means operative to move said bale forming means to its bale discharging position and to return same to its initial bale starting position, means for driving and controlling said conveyor comprising a normally rotating shaft, a pair of elements mounted for coaxial rotation relative to each other and relative to said shaft, a positive driving connection between one of said elements and said conveyor, means carried by said shaft for rotation therewith in continuous engagement with both of said elements, a movable member positionable to control the rotation of the other one of said elements in a predetermined direction, and means including a first part responsive to the bale attaining a predetermined diameter and a second part responsive to the return of the bale forming means to its initial bale starting position for controlling the position of said member and thereby the rotation of said other element in said predetermined direction.

4. In a machine embodying a bale forming means positionable to roll material delivered thereto into a formed cylindrical bale of predetermined diameter and positionable to discharge the formed bale from the machine, a conveyor for delivering material to said bale forming means, and means operative to move said bale forming means to its bale discharging position and to return same to its initial bale starting position, means for driving and controlling said conveyor comprising a normally rotating shaft, a pair of elements mounted for coaxial rotation relative to each other and relative to said shaft, a positive driving connection between one of said elements and said conveyor, means carried by said shaft for rotation therewith in continuous engagement with both of said elements, a member positionable to engage and prevent rotation of the other one of said elements in a predetermined direction, means continuously acting to quickly disengage said member from said other element, and means including a first part responsive to the bale attaining a predetermined diameter and a second part responsive to the return of the bale forming means to its initial bale starting position for limiting the element disengaging movement of said member and for controllably engaging and retaining said member engaged with said other element to prevent a rotation thereof in said predetermined direction.

5. In a machine embodying a bale forming means positionable to roll material delivered thereto into a formed cylindrical bale of predetermined diameter and positionable to discharge the formed bale from the machine, a conveyor for delivering material to said bale forming means, and means operative to move said bale forming means to its bale discharging position and to immediately return same to its initial bale starting position, a normally rotating shaft, a pair of gear elements mounted for coaxial rotation relative to each other and relative to said shaft, a positive driving connection between one of said elements and said conveyor, means for positively and selectively driving either one of said elements comprising an idler gear carried by said shaft to continually mesh with both of said gear elements while bodily moving coaxially about said shaft, a movable member positionable to engage and prevent rotation of the other one of said elements in a predetermined direction, means continuously acting to quickly disengage said member from said other element, and means including a first part responsive to the bale attaining a predetermined diameter and a second part responsive to the return of the bale forming means to its initial bale starting position for controllably releasing and limiting the element disengaging movement of said member and for controllably engaging and retaining said member in engagement with said other element.

6. In a machine embodying a bale forming means positionable to roll material delivered thereto into a formed cylindrical bale of predetermined diameter and positionable to discharge the formed bale from the machine, a conveyor for delivering material to said bale forming means, and means operative to move said bale forming means to its bale discharging position and to immediately return same to its initial bale starting position, a normally rotating shaft, a pair of gear elements mounted for coaxial rotation relative to each other and relative to said shaft, a positive driving connection between one of said elements and said conveyor, means for positively and selectively driving either one of said elements comprising a first member mounted on said shaft to rotate therewith, an idler gear carried by said first member to continually mesh with both of said gear elements while bodily moving coaxially about said shaft, a second member positionable to engage and prevent rotation of the other one of said elements in a predetermined direction, means continuously acting to quickly disengage said second member from said other element, means including a part responsive to the return of the bale forming means to its initial bale starting position for limiting the element disengaging movement of said second member and for moving said second member sufficiently to engage same with and prevent a rotation of said other element in said predetermined direction, latch means operative to engage and releasably retain said second member in engagement with said other element, and means responsive to the bale attaining a predetermined diameter for controlling said latch means.

7. In a machine embodying a bale forming means positionable to roll material delivered thereto into a formed cylindrical bale of predetermined diameter and positionable to discharge the formed bale from the machine, a conveyor for delivering material to said bale forming means, and means operative to move said bale forming means to its bale discharging position and to immediately return same to its initial bale starting position, means for driving and controlling said conveyor comprising a normally rotating shaft, a pair of elements mounted for coaxial rotation relative to each other and relative to said shaft, said elements each including an integral gear part disposed in spaced opposed coaxial relation to the gear of the other element and one of said elements also including a coaxial ratchet-like surface, a member mounted on said shaft to rotate therewith, an idler gear disposed in meshing relation between said opposed gear parts and carried by said member for movement therewith coaxially about said shaft, a pivotally mounted pawl carrying plate positionable to engage a pawl mounted thereon with said ratchet-like surface to thereby prevent rotation of said one element in a predetermined direction, means continuously acting to quickly move said plate in a direction to disengage said pawl from said ratchet-like surface, means including a part responsive to the return of said bale forming means to its initial bale starting position for limiting the movement of said plate in said pawl disengaging direction and for moving said plate sufficiently to engage said pawl with said ratchet-like surface, latch means operative to engage and releasably retain said plate in the position in which said pawl engages said ratchet-like surface, and means responsive to the bale attaining a predetermined diameter for controlling said latch means.

8. In a machine embodying a bale forming means positionable to roll material delivered thereto into a formed cylindrical bale of predetermined diameter and positionable to discharge the formed bale from the machine, a conveyor for delivering material to said bale forming means, and means operative to move said bale forming means to its bale discharging position and to immediately return same to its initial bale starting position, means for driving and controlling said conveyor comprising a normally rotating shaft, a first element rotatably mounted on said shaft and including a ratchet-like peripheral surface and an axially extending hub portion presenting an external gear and an external coaxial journal, a member mounted on said shaft for rotation therewith and including an axially extending hub portion presenting an external coaxial journal axially spaced from the journal on the hub portion of said first element, an idler gear mounted on said member for movement therewith and so as to continually mesh with said external gear as said idler gear is moved coaxially about said shaft, a second element having axially spaced hub portions rotatably mounted on said journals and having an external portion connected in positive driving relation with said conveyor and an internal coaxial gear in mesh with said idler gear, a pivotally mounted pawl carrying plate positionable to engage a pawl mounted thereon with said ratchet-like surface and thereby prevent rotation of said first element in a predetermined direction, means continuously acting to quickly move said plate in a direction to disengage said pawl from said ratchet-like surface, means including a part responsive to the return of said bale forming means to its initial bale starting position for limiting the movement of said plate in said pawl disengaging direction and for moving said plate sufficiently to engage said pawl with said ratchet-like surface; latch means operative to engage and releasably retain said plate in the position in which said pawl engages said ratchet-like surface, and means responsive to the bale attaining a predetermined diameter for controlling said latch means.

9. In a machine embodying a bale forming means positionable to roll material delivered thereto into a formed cylindrical bale of predetermined diameter and positionable to discharge the formed bale from the machine, a conveyor for delivering material to said bale forming means, apparatus including a movable twine feeding device adapted to be positioned adjacent one end of the bale and then moved lengthwise thereof for wrapping twine about the bale while it is in the machine, and means operative in response to completion of the bale wrapping operation for moving said bale forming means to its bale discharging position and for immediately returning same to its initial bale starting position, means for driving and controlling said conveyor comprising a normally rotating shaft, a first element rotatably mounted on said shaft and including a ratchet-like peripheral surface and an axially extending hub portion presenting an external gear and an external coaxial journal, a member mounted on said shaft for rotation therewith and including an axially extending hub portion presenting an external coaxial journal axially spaced from the journal on the hub portion of said first element, an idler gear mounted on said member for movement therewith and so as to continually mesh with said external gear as said idler gear is moved coaxially about said shaft, a second element having axially spaced hub portions rotatably mounted on said journals and having an external portion connected in positive driving relation with said conveyor and an internal coaxial gear in mesh with said idler gear, a pivotally mounted pawl carrying plate positionable to engage a pawl mounted thereon with said ratchet-like surface and thereby prevent rotation of said first element in a predetermined direction, means continuously acting to quickly move said plate in a direction to disengage said pawl from said ratchet-like surface, means including a part responsive to the return of said bale forming means to its initial bale starting position for limiting the movement of said plate in said pawl disengaging direction and for moving said plate sufficiently to engage said pawl with said ratchet-like surface; latch means continuously acting to engage and releasably retain said device in an inoperative twine feeding position and said plate in the position in which said pawl engages said ratchet-like surface, and means responsive to the bale attaining a predetermined diameter for moving said latch to sequentially release said twine feeding device and plate in the order named.

10. In a machine embodying a bale forming means positionable to roll material delivered thereto into a formed cylindrical bale of predetermined diameter and positionable to discharge the formed bale from the machine, a conveyor for delivering material to said bale forming means, apparatus including a movable twine feeding device adapted to be positioned adjacent one end of the bale and then moved lengthwise thereof for wrapping twine about the bale while it is in the machine, and means operative in response to completion of the bale wrapping operation for moving said bale forming means to its bale discharging position and for immediately returning same to its initial bale starting position, means for driving and controlling said conveyor comprising a movable element positionable to start and stop the conveyor, a biasing means continuously acting to quickly move said element to its conveyor stopping position, a first part operative to determine the conveyor stopping position of said element and operative in response to the return of said bale forming means to its initial bale starting position for quickly moving said element to its conveyor starting position, movable latch means biased to engage and retain said device in an inoperative position and said element in its conveyor starting position, a second part controlling the position of said latch means and operative in response to the bale attaining a predetermined diameter to sequentially release said device and element in the order named.

11. In a machine embodying a bale forming means positionable to roll material delivered thereto into a formed cylindrical bale of predetermined diameter and positionable to discharge the formed bale from the machine, a conveyor for delivering material to said bale forming means, apparatus including a movable twine feeding device adapted to be positioned adjacent one end of the bale and then moved lengthwise thereof for wrapping twine about the bale while it is in the machine, and means operative in response to completion of the bale wrapping operation for moving said bale forming means to its bale discharging position and for immediately returning same to its initial bale starting position, means for driving and controlling said conveyor comprising a movable element positionable to start and stop the conveyor, a first part operative to determine the conveyor stopping position of said element and operative in response to the return of said bale forming means to its initial bale starting position for quickly moving said element to its conveyor starting position, latch means positionable to engage and retain said device in an inoperative position and said element in its conveyor starting position, a second part controlling the position of said latch means and operative in response to the bale attaining a predetermined diameter to sequentially release said device and element in the order named.

12. In a machine embodying a bale forming means positionable to roll material delivered thereto into a formed cylindrical bale of predetermined diameter and positionable to discharge the formed bale from the machine, a conveyor for delivering material to said bale forming means, and means operative to move said bale forming means to its bale discharging position and to return same to its initial bale starting position, means for driving and controlling said conveyor comprising a normally rotating shaft, a pair of elements mounted for rotation relative to each other and relative to said shaft, a positive driving connection between one of said elements and said conveyor, means carried by said shaft for rotation therewith in continuous engagement with both of said elements, a movable means positionable to engage and prevent rotation of the other one of said elements in a predetermined direction, a biasing means continuously acting to disengage said movable means and other element, a first part operative to determine the disengaged position of said movable means and operative in response to the return of said bale forming means to its initial bale starting position for quickly engaging said movable means with said other element, a movable latch means biased to engage and retain said movable means engaged with said other element, and a second part responsive to the bale attaining a predetermined diameter for controlling the position of said latch means.

13. In a machine embodying apparatus including a normally rotating shaft for treating material delivered thereto and a conveyor for delivering the material to said apparatus, mechanism for driving and controlling said conveyor comprising a pair of elements mounted for rotation relative to each other and relative to said shaft, a positive driving connection between one of said elements and said conveyor, a first means carried by said shaft for rotation therewith in continuous engagement with both of said elements, a second means positionable to engage and prevent rotation of the other one of said elements in a predetermined direction, a third means continuously acting to disengage said second means from said other element, a first part operative in response to a predetermined movement of said apparatus for quickly engaging said second means with said other element, a fourth means operative to retain said second means engaged with said other element, and a second part responsive to another predetermined movement of said apparatus for controlling the position of said fourth means.

14. In a machine embodying apparatus including a normally rotating shaft for treating material delivered thereto and a conveyor for delivering the material to said apparatus, mechanism for driving and controlling said conveyor comprising a pair of elements mounted for rotation relative to each other and relative to said shaft, a positive driving connection between one of said elements and said conveyor, a first means carried by said shaft for rotation therewith in continuous engagement with both of said elements, a second means positionable to engage and prevent rotation of the other one of said elements in a predetermined direction, a first part operative in response to a predetermined movement of said apparatus for quickly engaging said second means with said other element, a third means operative to retain said second means engaged with said other element, and a second part responsive to another predetermined movement of said apparatus for controlling the position of said third means.

15. In a machine embodying a bale forming means positionable to roll material delivered thereto into a formed cylindrical bale of predetermined diameter and positionable to discharge the formed bale from the machine and a conveyor for delivering material to the bale forming means, means for driving and controlling the conveyor comprising a normally rotating shaft, a power transmitting mechanism operatively connecting said conveyor and shaft, a movably mounted member positionable to engage an element of said mechanism to thereby control operation of the conveyor, means continuously acting to effect a quick snap-action, element-disengaging movement of said member, a first part operative in response to the return of the bale forming means to its initial bale starting position for quickly moving said member into engagement with said element, a movable latch means biased to engage and retain said member in engagement with said element, and a second part responsive to the bale attaining a predetermined diameter controlling the position of said latch means.

16. In a machine embodying a bale forming means positionable to roll material delivered thereto into a formed cylindrical bale of predetermined diameter and positionable to discharge the formed bale from the machine and a conveyor for delivering material to the bale forming means, means for driving and controlling the conveyor comprising a normally rotating shaft, a power transmitting mechanism operatively connecting said conveyor and shaft, a movably mounted member positionable to engage an element of said mechanism to thereby control operation of the conveyor, means continuously acting to effect a quick snap-action, element-disengaging movement of said member, a first part operative in response to the return of the bale forming means to its initial bale starting position for quickly moving said member into engagement with said element, and means including a second part responsive to bale size for retaining said member engaged with said element until the bale attains a predetermined diameter and for then releasing said member for quick actuation by said continuously acting means.

17. In a machine embodying a bale forming means positionable to roll material delivered thereto into a formed cylindrical bale of predetermined diameter and positionable to discharge the formed bale from the machine and a conveyor for delivering material to the bale forming means, means for driving and controlling the conveyor comprising a normally rotating shaft, a power transmitting mechanism operatively connecting said conveyor and shaft, a movably mounted member positionable to engage an element of said mechanism to thereby control operation of the conveyor, means continuously acting to effect a quick snap-action, element-disengaging movement of said member, and means including a part responsive to the return of the bale forming means to its initial bale starting position for limiting the extent said member is moved away from said element and for quickly moving said member sufficiently to operatively engage same with said element.

18. In a machine embodying a bale forming means positionable to roll material delivered thereto into a formed cylindrical bale of predetermined diameter and positionable to discharge the formed bale from the machine, a conveyor for delivering material to said bale forming means, apparatus including a movable twine feeding device adapted to be positioned adjacent one end of the bale and then moved lengthwise thereof for wrapping twine about the bale while it is in the machine, and means operative in response to completion of the bale wrapping operation for moving said bale forming means to its bale discharging position and for immediately returning same to its initial bale starting position, means for driving and controlling said conveyor comprising a movable member positionable to start and stop the conveyor, means including a first part operative in response to the return of the bale forming means to its initial bale starting position for quickly moving said member to its conveyor starting position, and means including a second part responsive to bale size for retaining said twine wrapping device in an inoperative position and said member in its conveyor starting position until the bale attains a predetermined diameter and for then sequentially releasing said device and member in the order named.

19. In a machine embodying a bale forming means positionable to roll material delivered thereto into a formed cylindrical bale of predetermined diameter and positionable to discharge the formed bale from the machine and a conveyor for delivering material to the bale forming means, means for driving the conveyor comprising a normally rotating shaft, and a power transmitting mechanism operatively connecting said conveyor and shaft, and means for controlling operation of the conveyor comprising mechanism including a part responsive to bale size for retaining a member engaged with an element of said power transmitting mechanism until the bale attains a predetermined diameter and for then effecting a quick snap-action, element-disengaging movement of said member.

PAUL H. HARRER.

REFERENCES CITED

The following references are of record in the file of this patent:

UNITED STATES PATENTS

| Number | Name | Date |
| --- | --- | --- |
| 2,096,990 | Luebben | Oct. 26, 1937 |
| 2,336,491 | Luebben | Dec. 14, 1943 |
| 1,849,882 | Pearson | Mar. 15, 1932 |